United States Patent [19]

Michie, Jr. et al.

[11] Patent Number: 5,514,455
[45] Date of Patent: * May 7, 1996

[54] FILM EXTRUDED FROM AN IN SITU BLEND OF ETHYLENE COPOLYMERS

[75] Inventors: William J. Michie, Jr., Raritan; Guylaine St. Jean, Somerset, both of N.J.

[73] Assignee: Union Carbide Chemicals & Plastics Technology Corporation, Danbury, Conn.

[*] Notice: The portion of the term of this patent subsequent to Jul. 8, 2014, has been disclaimed.

[21] Appl. No.: 272,258

[22] Filed: Jul. 8, 1994

[51] Int. Cl.$^6$ .............................. C08L 23/08; C08L 23/20
[52] U.S. Cl. .................... 428/220; 525/240; 525/320; 525/321; 525/324
[58] Field of Search ................ 428/220; 525/53, 525/240, 320, 321, 324

[56] References Cited

U.S. PATENT DOCUMENTS

| 4,438,238 | 3/1984 | Fukushima et al. | 525/240 |
| 5,082,902 | 1/1992 | Gurevitch et al. | 525/240 |
| 5,102,955 | 4/1992 | Calabro et al. | 525/240 |
| 5,126,398 | 6/1992 | Lee et al. | 525/53 |
| 5,284,613 | 1/1994 | Ali et al. | 264/566 |

FOREIGN PATENT DOCUMENTS

| 503791 | 9/1992 | European Pat. Off. . |
| 528523 | 2/1993 | European Pat. Off. . |
| 533452 | 3/1993 | European Pat. Off. . |
| 58-008712 | 1/1983 | Japan . |
| WO93-07210 | 4/1993 | WIPO . |

*Primary Examiner*—Carman J. Seccuro, Jr.
*Attorney, Agent, or Firm*—Saul R. Bresch

[57] ABSTRACT

A film comprising a blend of copolymers, which has been (i) extruded to a gauge in the range of about 0.3 to about 0.9 mil, said film having an Elmendorf Tear Strength in the machine direction of at least about 25 grams per mil greater than the Elmendorf Tear Strength in the machine direction of the same blend of copolymers, which has been extruded to a gauge of one mil, or (ii) extruded to a heavy gauge of at least about 5 mils and then biaxially oriented and reduced to a gauge of about 1.5 mils or less, first in the machine direction at a gauge reduction ratio of at least about 2:1, and then in the transverse direction at a gauge reduction ratio of at least about 1.5:1, said blend having been produced in situ by contacting ethylene and at least one alpha-olefin comonomer having 3 to 8 carbon atoms with a magnesium/titanium based catalyst system in each of two reactors connected in series, under polymerization conditions.

2 Claims, No Drawings

5,514,455

FILM EXTRUDED FROM AN IN SITU BLEND OF ETHYLENE COPOLYMERS

TECHNICAL FIELD

This invention relates to film extruded from a blend of ethylene copolymers prepared in a series of polymerization reactors.

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process such as those described in U.S. Pat. Nos. 5,047,468 and 5,126,398. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two reactors connected in series, said catalyst system comprising: (i) a supported titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:

(1) the alpha-olefin is present in a ratio of about 0.02 to about 3.5 moles of alpha-olefin per mole of ethylene; and (2) hydrogen is present in a ratio of about 0.05 to about 3 moles of hydrogen per mole of combined ethylene and alpha-olefin;

(d) in the low melt index reactor:

(1) the alpha-olefin is present in a ratio of about 0.02 to about 3.5 moles of alpha-olefin per mole of ethylene; and (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, industry continues to seek films with characteristics tailored to particular applications. One such application is consumer and institutional garbage bags, which requires a film of thin gauge having high Elmendorf Tear Strength. Another such application is meat wrap, which requires a biaxially oriented film with adequate stress avoidance tolerance having a thickness of 1.5 mils or less produced from blown or cast heavy gauge film without breakage due to gels or any other contaminants.

DISCLOSURE OF THE INVENTION

An object of this invention, therefore, is to provide an in situ blend, which can be extruded into a thin gauge film having high Elmendorf Tear Strength or a biaxially oriented thin film with sufficient stress avoidance tolerance to essentially avoid breakage. Other objects and advantages will become apparent hereinafter.

According to the present invention such an in situ blend has been discovered, which unexpectedly gives rise to two film embodiments. The blend is produced in situ by contacting ethylene and at least one alpha-olefin comonomer having 3 to 8 carbon atoms with a magnesium/titanium based catalyst system in each of two reactors connected in series, under polymerization conditions, wherein the polymer formed in the first reactor has a flow index in the range of about 0.01 to about 30 grams per 10 minutes and a density in the range of about 0.860 to about 0.940 gram per cubic centimeter and the polymer formed in the second reactor has a melt index in the range of about 50 to about 3000 grams per 10 minutes and a density in the range of about 0.900 to about 0.970 gram per cubic centimeter, the weight ratio of first reactor polymer to second reactor polymer being in the range of about 0.67:1 to about 1.5:1.

The first film embodiment comprises the above blend of copolymers, which has been extruded to a gauge in the range of about 0.3 to about 0.9 mil, said film having an Elmendorf Tear Strength in the machine direction at least about 25 grams per mil greater than the Elmendorf Tear Strength in the machine direction of the same blend of copolymers, which has been extruded to a gauge of one mil. Surprisingly, it is found that for this particular in situ blend, a reduction in the gauge, i.e., thickness, of the film results in a dramatic increase in Elmendorf Tear Strength, which is just the opposite of what would be expected.

The second film embodiment is a biaxially oriented film reduced in thickness from a blown or cast heavy gauge film extruded from the in situ blend described above. The film comprises a blend of copolymers, which has been extruded to a heavy gauge of at least about 5 mils and then biaxially oriented and reduced to a thickness of about 1.5 mils or less, first in the machine direction at a gauge reduction ratio of at least about 2:1, and then in the transverse direction at a gauge reduction ratio of at least about 1.5:1. Surprisingly, it was found that for this particular in situ blend, the combination of biaxial orientation and reduction in thickness from heavy gauge to thin film results in a film with essentially no breaks even though the in situ blend contains numerous small and large size gels and other contaminants and the film is 1.5 mils or less. This result is certainly unexpected.

DESCRIPTION OF THE PREFERRED EMBODIMENTS(S)

The gauge or thickness of the film, which is the subject of the first embodiment, is in the range of about 0.3 to about 0.9 mil, and is preferably in the range of about 0.3 to about 0.7 mil. In addition to the thin gauge, the film is defined by its Elmendorf Tear Strength, which is at least about 25 grams per mil greater in the machine direction than the Elmendorf Tear Strength in the machine direction of the same blend of copolymers, which has been extruded to a gauge of one mil. The Elmendorf Tear Strength in the machine direction is at least about 50 grams per rail greater at 0.7 mil than at one mil.

Elmendorf Tear Strength is a measure of the film's resistance to tearing propagation of a precut slit, and assures that the film will be capable of being utilized, for example, the consumer or institutional garbage bag mentioned above. Elmendorf Tear Strength is determined under ASTM D-1992-89. It is measured in grams per mil both in the machine direction (MD) and in the transverse direction (TD). The Elmendorf Tear Strength in the machine direction can be at least about 200 grams per rail, and is preferably in the range of about 200 to about 500 grams per mil. The Elmendorf Tear Strength in the transverse direction can be at least about 700 grams per mil, and is preferably in the range of about 700 to about 1200 grams per mil.

As noted, the film is formed by extrusion. The extruder is a conventional one using a die, which will provide the desired gauge. Examples of various extruders, which can be used in forming the film, are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The gauge or thickness of the biaxially oriented thin film, which is the subject of the second embodiment, is no greater than about 1.5 mils, and is preferably in the range of about 0.30 to about 1.2 mils. In addition to the thin gauge, the film has an unexpectedly high stress avoidance tolerance to gels and contaminants residing in the resin from which the film is made assuring that the film will be capable of being utilized in meat wrapping and like applications. The stress avoidance tolerance determined in the biaxial orientation/ reduction trial is measured by the number of breaks per foot of film.

As noted, the heavy gauge film is formed by extrusion, preferably blown or cast. A typical extruder is described above. The biaxial orientation and reduction, typically, takes place first in a machine direction (MD) orienter between two sets of differential speed rollers capable of reducing the film thickness in a gauge reduction ratio of at least about 2:1, and preferably in a gauge reduction ratio in the range of about 2:1 to about 5:1. This orientation can take place at ambient temperatures up to temperatures just below the crystalline melting point of the resin. The rollers can be fed with pre-extruded heavy gauge film or via a standard extruder as described above, which is preferably equipped with a standard sheet die and nip roll assembly to provide warmer than ambient sheet to the MD orienter. Initial heavy gauge film thickness is preferably in the range of about 5 to about 30 mils. This MD oriented film is then oriented in a separate heated tenter frame assembly to which the film is clamped every few inches and moved slowly through a heated oven where it is first heated to very slightly below its crystalline melting point and then oriented in the TD direction at gauge reduction ratio of at least about 1.5:1, preferably in the range of about 1.5:1 to about 4:1, thus producing a biaxially oriented film by orientation below the crystalline melting point.

The blend is produced in two staged reactors connected in series wherein a mixture of resin and catalyst precursor is transferred from the first reactor to the second reactor in which another copolymer is prepared and blends in situ with the copolymer from the first reactor.

The copolymers produced in each of the reactors are copolymers of ethylene and at least one alpha-olefin comonomer having 3 to 8 carbon atoms, preferably one or two alpha-olefin comonomers. The alpha-olefins can be, for example, propylene, 1-butene, 1-hexene, 4-methyl- 1-pentene, and 1-octene.

Preferred comonomer combinations:

| first reactor | second reactor |
| --- | --- |
| 1-hexene | 1-hexene |
| 1-butene | 1-hexene |
| 1-butene | 1-butene |
| 1-hexene | 1-butene |

The 1-hexene/1-hexene combination is found to give the best film properties; however, the 1-hexene/1-butene combination is found to provide acceptable properties while still meeting FDA specifications since a terpolymer increases the FDA allowable comonomer content, e.g., for a 1-hexene copolymer, the maximum allowable comonomer content is 10 percent by weight whereas for a 1-hexene/1-butene terpolymer, the maximum allowable comonomer content is 15 percent by weight. For FDA purposes, the 1-hexene/1-hexene combination is considered a copolymer and the 1-hexene/1-butene combination is considered a terpolymer.

It will be understood that the in situ blend can be characterized as a bimodal resin. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

The magnesium/titanium based catalyst system can be exemplified by the catalyst system described in U.S. Pat. No. 4,302,565 although the precursor is preferably unsupported. Another preferred catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium. Alternatively, the low molecular weight copolymer is prepared in the first reactor and the high molecular weight copolymer is prepared in the second reactor.

In the high molecular weight reactor:

Because of the low values, instead of melt index, flow index is determined and those values are used in this specification. The flow index can be in the range of about 0.01 to about 30 grams per 10 minutes, and is preferably in the range of about 0.8 to about 12 grams per 10 minutes. The molecular weight of this polymer is, generally, in the range of about 135,000 to about 445,000. The density of the copolymer can be at least 0.860 gram per cubic centimeter, and is preferably in the range of 0.900 to 0.930 gram per cubic centimeter. The melt flow ratio of the polymer can be in the range of about 20 to about 70, and is preferably about 22 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

In the low molecular weight reactor:

A relatively high melt index (or low molecular weight) copolymer is prepared in this reactor. The high melt index can be in the range of about 50 to about 3000 grams per 10 minutes, and is preferably in the range of about 50 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.955 gram per cubic centimeter. The melt flow ratio of this copolymer can be in the range of about 20 to about 70, and is preferably about 20 to about 45.

The blend or final product, as removed from the second reactor, can have a melt index in the range of about 0.2 to about 3.5 grams per 10 minutes, and preferably has a melt index in the range of about 0.5 to about 2.0 grams per 10 minutes. The molecular weight of the final product is, generally, in the range of about 90,000 to about 250,000. The density of the blend is at least 0.915 gram per cubic centimeter, and is preferably in the range of 0.916 to 0.930 gram per cubic centimeter.

The blend has a broad molecular weight distribution which can be characterized as bimodal. The broad molecular weight distribution is reflected in an Mw/Mn ratio of about 8 to about 20, preferably about 9 to about 18. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.67:1 to about 1.5:1, and is preferably in the range of about 0.75:1 to about 1.33:1. The optimum weight ratio is about 1:1.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor:

The mole ratio of alpha-olefin to ethylene can be in the range of about 0.05:1 to about 0.4:1, and is preferably in the range of about 0.13:1 to about 0.26:1. The mole ratio of hydrogen (if used) to ethylene can be in the range of about 0.017:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

The mole ratio of alpha-olefin to ethylene can be in the range of about 0.1:1 to about 0.6:1, and is preferably in the range of about 0.2:1 to about 0.42:1. The mole ratio of hydrogen to ethylene can be in the range of about 1.0:1 to about 2.5:1, and is preferably in the range of about 1.7:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Advantages of the film of the first embodiment are as follows: The combination of thin gauge and high Elmendorf Tear Strength both in the machine direction and the transverse direction, a particular advantage being a higher Elmendorf Tear Strength with thinner gauges in the 0.3 to 0.7 mil range. The extrusion behavior of the in situ blend is similar to that of high pressure, low density polyethylene with die gaps of about 60 mils. The extensional behavior of the film is more similar to that of linear low density polyethylene than high pressure low density polyethylene since there is no strain hardening present in the curves.

The advantage of the second embodiment is that it provides a biaxially oriented thin film useful in the packaging of meat and in other similar applications. The film has such a high stress avoidance tolerance that it can be produced with essentially no breaks even though the resin from which it is made has numerous small gels having sizes in the 50 to 150 micron range and numerous large gels having sizes in the 150 to 500 micron range, and other contaminants. Such a film is all the more surprising because there are few, if any, linear low density polyethylenes (LLDPE), which are even capable of being biaxially oriented, and the in situ blend from which the film is made is very closely related to LLDPEs.

Patents mentioned in this specification are incorporated by reference herein.

The invention is illustrated by the following examples.

EXAMPLES 1 to 3

The manufacture of the magnesium/titanium based catalyst used in these examples is described in U.S. Pat. No. 4,302,565 although the precursor is preferably unsupported. The preferred catalyst system is one where the precursor is formed by spray drying and is used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst composition and method of preparing same used in these examples is of the same composition and preparation method as example 1 of '745 except that 0.45 mol of diethylaluminum chloride per mol of tetrahydrofuran is used instead of 0.5 mol.

Polyethylene is produced using the following standard procedure. With respect to reaction conditions, the example 1 variables are set forth in Table I; the example 2 variables are set forth in Table II; and the example 3 variables are set forth in Table III. In addition to the reaction conditions, the Tables set forth resin properties; the molecular weight distribution of the final product, i.e., the in situ blend; the film extrusion conditions, i.e., the conditions used to extrude the blend into a film; and the key film property. Note that two films are extruded in each example, one having a gauge of 0.5 mil and the other having a gauge of 1.0 mil, and the Elmendorf Tear Strengths compared.

Ethylene is copolymerized with 1-butene or 1-hexene, as noted in the Tables. Triethylaluminum (TEAL) cocatalyst is added to each reactor during polymerization as a 5 weight percent solution in isopentane. The pressure in each reactor is 300 psia. Each polymerization is continuously conducted after equilibrium is reached under conditions set forth in Tables I to III.

Polymerization is initiated in the first reactor by continuously feeding the above catalyst precursor and cocatalyst triethylaluminum (TEAL), and into a fluidized bed of polyethylene granules together with ethylene, 1-hexene or 1-butene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene or 1-butene, and hydrogen are introduced into the second reactor where they come into contact with the copolymer and catalyst from the first reactor. Additional cocatalyst is also introduced. The product blend is continuously removed.

The Tables follow:

TABLE I

| reaction conditions | first reactor | second reactor | final product |
|---|---|---|---|
| temperature (°C.) | 70 | 90 | — |
| comonomer | 1-butene | 1-butene | — |

TABLE I-continued

| reaction conditions | first reactor | second reactor | final product |
|---|---|---|---|
| C2 partial pressure (psia) | 35 | 75 | — |
| H2/C2 molar ratio | 0.017 | 1.75 | — |
| comonomer/C2 molar ratio | 0.68 | 0.12 | — |
| catalyst feeder (rpm) | 8000 | — | — |
| TEAL feed rate (cc/hr) | 250 | 250 | — |
| production rate (lbs/hr) | 29.1 | 25.9 | — |
| bed weight (lbs) | 80 | 110 | — |
| residence time (hrs) | 2.70 | 2.00 | — |
| recycle isopentane (mol %) | 6.5 | 0 | — |
| isopentane feed rate (lbs/hr) | 4 | 0 | — |
| resin properties | | | |
| flow index (g/10 min) | 5.4 | — | 90.8 |
| melt index (g/10 min) | — | 400 | 1.34 |
| density (g/cc) | 0.902 | 0.945 | 0.9268 |
| melt flow ratio | — | 22 | 67.8 |
| residual titanium (ppm) | 4.21 | 2.24 | — |
| bulk density (lbs/cu ft) | 15 | 18 | — |
| average particle size (inch) | 0.032 | 0.029 | — |
| molecular weight distribution | | | |
| Mw | — | — | 146,000 |
| Mn | — | — | 13,300 |
| Mw/Mn | — | — | 11.0 |
| film extrusion conditions | | | |
| melt temperature (°C.) | — | — | 219 |
| die rate (lbs/hr/in) | — | — | 3.02 |
| frostline height (inches) | — | — | 6.5 |
| blow up ratio | — | — | 2.6:1 |
| gauge (mil) | — | — | 0.5/1.0 |
| key film property: Elmendorf Tear Strength | | | |
| machine direction | — | — | 207/119 |
| transverse direction | — | — | 763/603 |

TABLE II

| reaction conditions | first reactor | second reactor | final product |
|---|---|---|---|
| temperature (°C.) | 70 | 90 | — |
| comonomer | 1-hexene | 1-butene | — |
| C2 partial pressure (psia) | 25 | 70 | — |
| H2/C2 molar ratio | 0.027 | 1.75 | — |
| comonomer/C2 molar ratio | 0.22 | 0.12 | — |
| catalyst feeder (rpm) | 10,000 | — | — |

TABLE II-continued

| reaction conditions | first reactor | second reactor | final product |
|---|---|---|---|
| TEAL feed rate (cc/hr) | 250 | 250 | — |
| production rate (lbs/hr) | 27.5 | 22.5 | — |
| bed weight (lbs) | 80 | 110 | — |
| recycle isopentane (mol %) | 7.5 | 0 | — |
| isopentane feed rate (lbs/hr) | 5.5 | 0 | — |
| resin properties | | | |
| flow index (g/10 min) | 4.4 | — | 77.5 |
| melt index (g/10 min) | — | 400 | 0.71 |
| density (g/cc) | 0.9015 | 0.945 | 0.9275 |
| melt flow ratio | — | 22 | 109.2 |
| residual titanium (ppm) | 3.8 | 2.1 | — |
| bulk density (lbs/cu ft) | 17 | 20 | — |
| average particle size (inch) | 0.03 | 0.031 | — |
| molecular weight distribution | | | |
| Mw | — | — | 135,000 |
| Mn | — | — | 12,000 |
| Mw/Mn | — | — | 11.3 |
| film extrusion conditions | | | |
| melt temperature (°C.) | — | — | 217 |
| die rate (lbs/hr/in) | — | — | 2.42 |
| frostline height (inches) | — | — | 6.5 |
| blow up ratio | — | — | 2.6:1 |
| gauge (mil) | — | — | 0.5/1.0 |
| key film property: Elmendorf Tear Strength | | | |
| machine direction | — | — | 206/94 |
| transverse direction | — | — | 1136/887 |

TABLE III

| reaction conditions | first reactor | second reactor | final product |
|---|---|---|---|
| temperature (°C.) | 70 | 90 | — |
| comonomer | 1-hexene | 1-hexene | — |
| C2 partial pressure (psia) | 33 | 71 | — |
| H2/C2 molar ratio | 0.030 | 1.75 | — |
| comonomer/C2 molar ratio | 0.23 | 0.060 | — |
| catalyst feeder (rpm) | 11,000 | — | — |
| TEAL feed rate (cc/hr) | 265 | 260 | — |
| production rate (lbs/hr) | 29.7 | 25.3 | — |
| bed weight (lbs) | 80 | 110 | — |
| residence time (hrs) | — | — | — |
| recycle isopentane (mol %) | 8.1 | 0 | — |
| isopentane feed | 4.5 | 0 | — |

TABLE III-continued

| reaction conditions | first reactor | second reactor | final product |
|---|---|---|---|
| rate (lbs/hr) | | | ... |
| resin properties | | | |
| flow index (g/10 min) | 4.4 | — | 83.8 |
| melt index (g/10 min) | — | 400 | 0.78 |
| density (g/cc) | 0.9015 | 0.946 | 0.9284 |
| melt flow ratio | — | 22 | 107.4 |
| residual titanium (ppm) | 4.92 | 2.67 | — |
| bulk density (lbs/cu ft) | 14.6 | 17.9 | — |
| average particle size (inch) | 0.043 | 0.037 | — |
| molecular weight distribution | | | |
| Mw | — | — | 200,000 |
| Mn | — | — | 13,200 |
| Mw/Mn | — | — | 15.2 |
| film extrusion conditions | | | |
| melt temperature (°C.) | — | — | 217 |
| die rate (lbs/hr/in) | — | — | 2.93 |
| frostline height (inches) | — | — | 6.5 |
| blow up ratio | — | — | 2.6:1 |
| gauge (mil) | — | — | 0.5/1.0 |
| key film property: Elmendorf Tear Strength | | | |
| machine direction | — | — | 354/138 |
| transverse direction | — | — | 1173/927 |

Notes to above Tables:

1. Resin properties for second reactor: these are theoretical values based on the assumption that the second reactor copolymer is produced independently.

2. The films are extruded in a 1.5 inch Sterling™ blown tubular film extruder having a length to diameter ratio 24:1; a linear low density polyethylene screw; a three inch die; and a die gap of 30 mils. As noted, two films are extruded for each example, the first one having a gauge of 0.5 mil and the second having a gauge of 1.0 mil. The Elmendorf Tear Strength is determined for each film, both in the machine direction and the transverse direction, and the results recorded. The first value is the Elmendorf Tear Strength for the 0.5 mil film, and the second value is the Elmendorf Tear Strength for the 1.0 film. Note the great increase in Elmendorf Tear Strength in the machine direction for the smaller gauge.

3. Density is measured by producing a plaque in accordance with ASTM D-1928, procedure C, and then testing as is via ASTM D-1505.

4. Melt flow ratio is the ratio of flow index to melt index.

5. The molecular weight distribution is performed via Size Exclusion Chromatography using a Waters™ 150C with trichlorobenzene as solvent at 140 degrees C. with a broad molecular weight distribution standard and broad molecular weight distribution calibration method.

6. Die rate is defined as pounds per hour per inch of die circumference.

7. Frostline height is that distance off of the base of the die during which the polymer undergoes a phase transformation from a viscous liquid to a solid.

8. Blow up ratio is the ratio of the bubble diameter to the die diameter.

EXAMPLE 4

The manufacture of the magnesium/titanium based catalyst used in the example is described in U.S. Pat. No. 4,302,565 although the precursor is preferably unsupported. The preferred catalyst system is one where the precursor is formed by spray drying and used in slurry form. Such a catalyst precursor, for example, contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst composition and method of preparing same used in this example is the same composition and preparation method as example 1 of '745 filed except that diethylaluminum chloride and tri-n-hexylaluminum are not used.

Polyethylene is produced using the following standard procedure. With respect to reaction conditions, the variables are set forth in Table IV. In addition to reaction conditions, Table IV sets forth resin properties; the molecular weight distribution of the final product, i.e., the in situ blend; the film extrusion conditions; biaxial orientation conditions, i.e., the conditions used to biaxially orient/reduce the blend into a film; and the key film properties.

Ethylene is copolymerized with 1-butene or 1-hexene, as noted in Table IV. Triethylaluminum (TEAL) cocatalyst is added to each reactor during polymerization as a 5 weight percent solution in isopentane. The pressure in each reactor is 300 psia. Each polymerization is continuously conducted after equilibrium is reached under conditions set forth in Table IV.

Polymerization is initiated in the first reactor by continuously feeding the above catalyst precursor and cocatalyst triethylaluminum (TEAL), and into a fluidized bed of polyethylene granules together with ethylene, 1-hexene, and hydrogen. The TEAL is first dissolved in isopentane (5 percent by weight TEAL). The resulting copolymer mixed with active catalyst is withdrawn from the first reactor and transferred to the second reactor using nitrogen as a transfer medium. The second reactor also contains a fluidized bed of polyethylene granules. Ethylene, 1-butene, and hydrogen are introduced into the second reactor where they come into contact with the copolymer and catalyst from the first reactor. Additional cocatalyst is also introduced. The product blend is continuously removed.

The Table follows:

TABLE IV

| reaction conditions | first reactor | second reactor | final product |
|---|---|---|---|
| temperature (°C.) | 70 | 87.5 | — |
| comonomer | 1-hexene | 1-butene | — |
| C2 partial pressure (psia) | 19.4 | 71 | — |
| H2/C2 molar ratio | 0.07 | 1.7 | — |
| comonomer/C2 molar ratio | 0.24 | 0.007 | — |

TABLE IV-continued

| reaction conditions | first reactor | second reactor | final product |
|---|---|---|---|
| catalyst feed (lbs/hr) | 10.2 | — | — |
| TEAL feed rate (lbs/hr) | 56 | 56.4 | — |
| production rate (lbs/hr) | 12,860 | 11,130 | — |
| bed weight (lbs) | 52,400 | 68,500 | — |
| residence time (hrs) | 4.1 | 2.85 | — |
| resin properties |  |  |  |
| flow index (g/10 min) | 5.7 | — | 83 |
| melt index (g/10 min) | — | 400 | 0.63 |
| density (g/cc) | 0.9019 | 0.9450 | 0.9228 |
| melt flow ratio | — | 22 | 131 |
| residual titanium (ppm) | 4.33 | 2.66 | — |
| bulk density (lbs/cu ft) | 19 | 23.9 | — |
| average particle size (inch) | 0.019 | 0.018 | — |
| molecular weight distribution |  |  |  |
| Mw | — | — | 195,000 |
| Mn | — | — | 9,800 |
| Mw/Mn | — | — | 19.9 |
| film extrusion conditions |  |  |  |
| melt temperature (°C.) | — | — | 216 |
| die rate (lbs/ft/inch) | — | — | 6.4 |
| frostline height (inches) | — | — | 12 |
| blow up ratio | — | — | 2.4:1 |
| gauge (mils) | — | — | 8 to 10 |
| Biaxial orientation conditions |  |  |  |
| MD orientation: |  |  |  |
| temperature (°C.) | — | — | ambient |
| initial draw speed (ft/min) | — | — | 8.0 |
| final draw speed (ft/min) | — | — | 24.0 |
| inlet width (inches) | — | — | 10 |
| outlet width (inches) | — | — | 7 |
| inlet thickness (mils) | — | — | 8 to 10 |
| outlet thickness (mils) | — | — | 3.0 |
| breaks | — | — | NONE |
| TD orientation |  |  |  |
| inlet thickness (mils) | — | — | 3.0 |
| inlet width (inches) | — | — | 7.0 |
| preheat temp (°C.) | — | — | 96 |
| stretch temp (°C.) | — | — | 101.7 |
| anneal temp. (°C.) | — | — | 101.7 |
| line speed (ft/min) | — | — | 8.0 |
| final width (inches) | — | — | 19.75 |
| final thickness (mils) | — | — | 0.5 to 1.0 |
| breaks | — | — | NONE |
| key film properties: |  |  |  |
| dart drop (grams) | — | — | 320 |
| tensile strength (psi) MD | — | — | 13,400 |
| tensile strength (psi) TD | — | — | 12,900 |
| secant modulus (psi) MD | — | — | 43,200 |
| secant modulus (psi) TD | — | — | 57,500 |
| Elmendorf tear (grams/mil) |  |  |  |
| machine direction | — | — | 19 |
| transverse direction | — | — | 11 |

Notes to Tables:

1. Resin properties for the second reactor: these are theoretical values based on the assumption that the second reactor copolymer is produced independently.

2. The 8 to 10 mil film is prepared in a 1.5 inch Sterling™ blown tubular film extruder having a length to diameter ratio 24:1; a linear low density polyethylene screw; a three inch die; and a die gap of 30 mils. The film is made at a 2.4:1 blow up ratio and has an 11 inch layflat. The frostline height is 12 inches. The melt temperature profile is 400° F. and the melt temperature is 420° F. The resulting film is slit out to a sheet with a 10 inch layflat.

3. The biaxial orientation and reduction is carried out first in a machine direction (MD) orienter between two sets of differential speed rollers capable of reducing the film thickness in a gauge reduction ratio in the range of about 2:1 to about 5:1. This orientation takes place at ambient temperatures up to temperatures just below the crystalline melting point of the resin. The rollers are fed with the heavy gauge film prepared in the extruder described above, which is equipped with a standard sheet die and nip roll assembly to provide warmer than ambient sheet to the MD orienter. This MD oriented film is then oriented in a separate heated tenter frame assembly to which the film is damped every few inches and moved slowly through a heated oven where it is first heated to very slightly below its crystalline melting point and then oriented in the TD direction at gauge reduction ratio in the range of about 1.5:1 to about 4:1.

4. Density is measured by producing a plaque in accordance with ASTM D-1928, procedure C, and then testing as is via ASTM D-1505.

5. Melt flow ratio is the ratio of flow index to melt index.

6. The molecular weight distribution is performed via Size Exclusion Chromatography using a Waters™ 150C with trichlorobenzene as solvent at 140 degrees C. with a broad molecular weight distribution standard and broad molecular weight distribution calibration method.

7. Die rate is defined as pounds per hour per inch of die circumference.

8. Frostline height is that distance off of the base of the die that the polymer undergoes a phase transformation from a viscous liquid to a solid.

9. Blow up ratio is the ratio of the bubble diameter to the die diameter.

10. Initial draw speed is the speed of the moving film through the first set of nip rolls.

11. Final draw speed is the speed of the moving film through the second set of nip rolls.

12. Inlet width is the width of the film moving at the initial draw speed.

13. Outlet width is the width of the film moving at the final draw speed.

14. Inlet thickness is the thickness of the film moving at the initial draw speed.

15. Outlet thickness is the thickness of the film moving at the final draw speed.

16. TD orientation is in a heated tenter frame.

17. Dart drop is measured via ASTM D-1709

18. Tensile strength is measured by ASTM D-882 at 20 inches per minute.

19. Secant modulus is measured by ASTM D-882 at 1% secant.

20. Elmendorf tear is measured by ASTM D-1992.

We claim:

1. A film comprising a blend of copolymers, which has been extruded to a gauge in the range of about 0.3 to about 0.7 mil, said film having an Elmendorf Tear Strength in the machine direction at least about 50 grams per mil greater than the Elmendorf Tear Strength in the machine direction of the same blend of copolymers, which has been extruded to a gauge of one mil, said blend having been produced in situ by contacting ethylene and at least one alpha-olefin comonomer having 4 to 8 carbon atoms with a magnesium/titanium based catalyst system in each of two reactors connected in series, under polymerization conditions, wherein the polymer formed in the high molecular weight reactor has a flow index in the range of about 0.8 to about 12 grams per 10 minutes and a density in the range of about 0.900 to about 0.930 gram per cubic centimeter and the polymer formed in the low molecular weight reactor has a melt index in the range of about 50 to about 1000 grams per 10 minutes and a density in the range of about 0.910 to about 0.955 gram per cubic centimeter, the weight ratio of high molecular weight reactor polymer to low molecular weight reactor polymer being in the range of about 0.67:1 to about 1.5:1 wherein the blend has a melt index in the range of about 0.5 to about 2.0 grams per 10 minutes; a melt flow ratio in the range of about 55 to about 125; a density in the range of 0.916 to 0.930 gram per cubic centimeter; and an Mw/Mn ratio in the range of about 8 to about 22, and wherein the blend is produced under the following conditions:

(i) in the high molecular weight reactor: the mole ratio of alpha-olefin to ethylene is in the range of about 0.05:1 to about 0.4:1 and the mole ratio of hydrogen to ethylene is in the range of about 0.001:1 to about 0.3:1; and (ii) in the low molecular weight reactor: the mole ratio of alpha-olefin to ethylene is in the range of about 0.1:1 to about 0.6:1 and the mole ratio of hydrogen to ethylene is in the range of about 1.0:1 to about 2.5:1.

2. A film comprising a blend of copolymers, which has been extruded to a heavy gauge in the range of about 4.5 to about 30 mils and then biaxially oriented and reduced to a gauge of about 0.30 to about 1.2 mils, first in the machine direction at a gauge reduction ratio of about 2:1 to about 5:1, and then in the transverse direction at a gauge reduction ratio of about 1.5:1 to about 4:1, said blend having been produced in situ by contacting ethylene and at least one alpha-olefin comonomer having 4 to 8 carbon atoms with a magnesium/titanium based catalyst system in each of two reactors connected in series, under polymerization conditions, wherein the polymer formed in high molecular weight reactor has a flow index in the range of about 0.8 to about 12 grams per 10 minutes and a density in the range of about 0.900 to about 0.930 gram per cubic centimeter and the polymer formed in the low molecular weight reactor has a melt index in the range of about 50 to about 1000 grams per 10 minutes and a density in the range of about 0.910 to about 0.955 gram per cubic centimeter, the weight ratio of high molecular weight reactor polymer to low molecular weight reactor polymer being in the range of about 0.75:1 to about 1.33:1 wherein the blend has a melt index in the range of about 0.5 to about 2.0 grams per 10 minutes; a melt flow ratio in the range of about 55 to about 135; a density in the range of 0.916 to 0.930 gram per cubic centimeter; and an Mw/Mn ratio in the range of about 8 to about 22, and wherein the blend is produced under the following conditions:

(i) in the high molecular weight reactor: the mole ratio of alpha-olefin to ethylene is in the range of about 0.05:1 to about 0.4:1 and the mol ratio of hydrogen, if used, to ethylene is in the range of about 0.017:1 to about 0.30:1; and (ii) in the low molecular weight reactor: the mole ratio of alpha-olefin to ethylene is in the range of about 0.1:1 to about 0.6:1 and the mol ratio of hydrogen to ethylene is in the range of about 1.0:1 to about 2.5:1.

* * * * *